US007980792B2

(12) United States Patent
Siddle et al.

(10) Patent No.: US 7,980,792 B2

(45) Date of Patent: Jul. 19, 2011

(54) CASH HANDLING SYSTEM

(75) Inventors: Graham Siddle, Hartlebury (GB); Andrew Hawkes, Hartlebury (GB)

(73) Assignee: Zay Limited, Glostershire (GB)

( * ) Notice: Subject to any disclaimer, the term of this patent is extended or adjusted under 35 U.S.C. 154(b) by 168 days.

(21) Appl. No.: 12/326,451

(22) Filed: Dec. 2, 2008

(65) Prior Publication Data

US 2009/0146366 A1 Jun. 11, 2009

(30) Foreign Application Priority Data

Dec. 5, 2007 (GB) .................................. 0723795.1

(51) Int. Cl.
*B65G 51/06* (2006.01)

(52) U.S. Cl. ......................... 406/184; 406/186; 406/187

(58) Field of Classification Search .................. 406/184, 406/186, 187

See application file for complete search history.

(56) References Cited

U.S. PATENT DOCUMENTS

| | | | | |
|---|---|---|---|---|
| 1,613,471 | A * | 1/1927 | MacLaren | 406/186 |
| 4,470,730 | A * | 9/1984 | Wuthrich | 406/186 |
| 5,092,714 | A | 3/1992 | Porter et al. | |
| 5,101,979 | A | 4/1992 | Uno et al. | |
| 6,889,849 | B2 | 5/2005 | Heidel et al. | |
| 2004/0253061 | A1 | 12/2004 | Moller | |
| 2006/0076213 | A1 | 4/2006 | Sekiguchi et al. | |

FOREIGN PATENT DOCUMENTS

| | | | |
|---|---|---|---|
| DE | 10002641 | A1 | 8/2001 |
| EP | 1001387 | A1 | 5/2000 |
| GB | 2211823 | A | 7/1989 |

* cited by examiner

*Primary Examiner* — David H Bollinger

(74) *Attorney, Agent, or Firm* — Berliner & Associates

(57) ABSTRACT

The invention relates to a system for transporting a sheaf of notes from a storage location to a dispensing outlet. The system comprises a conveyor apparatus, a carrier within which the sheaf is transported through the conveyor apparatus, and an extractor for removing the sheaf from the carrier. The carrier comprises a resiliently biased gripper for gripping the sheaf with a first gripping force. The extractor comprises an extraction gripping device configured to grip the sheaf with a second gripping force, which is greater than the first gripping force.

18 Claims, 10 Drawing Sheets

CASH HANDLING SYSTEM

The present invention relates to an improved system for handling a sheaf of notes, particularly bank notes or the like.

GB-A-2,305,901 describes a money handling system in which a tube conveyor system is used to convey money between one location and a remote storage location. The money is conveyed in a carrier, which is placed (usually manually) into a sending station, and received at a receiving station situated at or close to the storage location, where the carrier is opened and the money extracted (again usually manually).

EP-A-0841644 describes a cash handling system in which parcels of bank notes are delivered to a collection location, such as an ATM machine. The system described is illustrated in FIGS. 1 and 2, and employs a "pick and place" mechanism 15 whereby a parcel of cash 21 is extracted from a storage unit 11 and delivered to the collection point 22. The "pick and place mechanism" 15 includes a carriage 17 that moves along a rail 16 or track, with an arm 18 that carries a jaw assembly 19. The jaws of the jaw assembly 19 can be opened or closed so as to grip or release a parcel. Thus, when there is a demand for cash to be delivered to the collection point 22, the carriage 17 is moved along the rail 16 until the jaw assembly 19 is aligned with a parcel 21 in the storage unit 11. The jaws are activated to grip the parcel, and the carriage 17 is then moved along the rail 16 to the collection point 22, where the jaws are opened to release the parcel.

The system also includes a conveyor arrangement for replenishing parcels in the storage unit 11. This is illustrated in FIG. 2. Within a vault or secure cash room 24 a conventional bank note counting and dispensing mechanism 25 compiles parcels of bank notes of predetermined value, and supplies them to the jaw assembly of a pick and place mechanism 26. The mechanism 26 then transports parcels individually from the dispensing mechanism 25 and inserts them into the sending station 28 of a pneumatic tube conveyor system 27. The conveying tube of the system 27 terminates at its opposite end in a receiving station 29 adjacent the storage unit 11 and accessible to the jaw assembly 19 of the pick and place mechanism 15. The mechanism 26 passes the parcel to the station 28 where it is introduced into a carrier and the carrier is dispatched along the tube system to the receiving station 29. Within the receiving station 29 the parcel is either removed from the carrier and presented for access by the jaw assembly 19, or alternatively the carrier itself is opened to provide access for the jaw assembly 19 to the parcel. Thereafter the mechanism 15 retrieves the parcel from the station 29 and introduces it into the storage unit 11.

These prior art cash handling systems rely on established designs of carriers for the pneumatic conveying. When the carrier arrives at its destination receiving station the parcel of notes has to be removed from the carrier (possibly involving opening of the carrier). Established carrier designs usually include a canister that can be dosed and opened by unscrewing or releasing a closure device. It is clearly undesirable, especially when providing cash to re-stock an ATM machine, for this operation to be performed manually. Automation of the process may involve a complex series of operations to ensure that the parcel of notes is correctly picked out of the carrier and delivered to its storage location.

The present invention has been conceived with the foregoing in mind.

According to a first aspect of the present invention there is provided a system for transporting a sheaf of notes from a storage location to a dispensing outlet. The system comprises a conveyor apparatus, a carrier within which the sheaf is transported through the conveyor apparatus, and an extractor for removing the sheaf from the carrier. The carrier comprises a resiliently biased gripper for gripping the sheaf with a first gripping force. The extractor comprises an extraction gripping device configured to grip the sheaf with a second gripping force, which is greater than the first gripping force.

Preferably the conveyor apparatus comprises a pneumatic conveyor, more preferably a pneumatic tube conveyor.

It is an advantage of the present invention that, because the resilient gripper grips the sheaf with a force that is less than the force of the extractor, then the extractor can remove the sheaf from the carrier without the need to activate any mechanism in the carrier itself. This means that the carrier does not have to be provided with any activation means, power supply or control signaling. Another advantage is that the sheaf is held in position in the carrier by the gripper, rather than being loosely deposited inside the carrier. This means that when the carrier is positioned at a location where the sheaf is to be extracted, the extractor will find the sheaf in correct alignment for extraction.

In embodiments of the invention, the gripper comprises a pair of opposing gripping surfaces biased towards each other. The gripping surfaces may be surfaces of a pair of plates. The plates may be shaped to provide a mouth for insertion of a sheaf between the plates. The plates may also be shaped to provide an ungripped portion of the sheaf in the carrier, the extractor being configured to grip the sheaf at the ungripped portion to remove the sheaf from the carrier.

In embodiments of the invention, the system further comprises a depositing mechanism for inserting a sheaf of notes into the carrier. The depositing mechanism may be configured to prize open the gripper and insert the sheaf into the carrier. The depositing mechanism may comprise a shaped member whereby insertion of the shaped member between the gripping surfaces prizes them apart to open the gripper.

According to a second aspect of the present invention there is provided a carrier for transporting a sheaf of notes through a conveyor. The carrier comprises a gripper having a pair of substantially parallel gripper plates moveable towards one another for gripping the sheaf. A biasing arrangement is configured to bias the gripper plates towards one another with a predetermined gripping force. The gripper plates are shaped so that a portion of the sheaf is not gripped between the plates thereby permitting extraction of the sheaf by an extractor gripping the sheaf at that portion with a force that is greater than the predetermined gripping force.

The plates may be shaped to receive the sheaf from an insertion direction substantially parallel to the gripping surfaces of the plates. Preferably, the plates having diverging opposing surfaces along an edge facing the insertion direction.

According to a third aspect of the invention there is provided an insertion device for inserting a sheaf of notes into a carrier. The carrier comprises a pair of gripper plates biased towards one another for gripping the sheaf of notes. The insertion device comprises: a gripper for holding the sheaf, and a plate separator comprising one or more members extending beyond the gripper in a direction in which the sheaf of notes is inserted into the carrier. Each member has a tapered form for separating the carrier gripper plates when the member is inserted there between.

In embodiments of the invention the gripper holds the sheaf with a gripping force that is smaller than the gripping force of the carrier gripper plates. Preferably, the insertion device comprises a pair of members having tapered forms for insertion between the carrier gripper plates.

According to a third aspect of the present invention there is provided a system for processing notes, such as bank notes. The system comprises: a carrier comprising a gripper for gripping a sheaf of notes; a conveyor apparatus for conveying the carrier; and a processing station for receiving the carrier. The processing station comprises: an extractor for extracting the sheaf of notes from the carrier and inserting the notes into a note processor. The note processor comprises one or more of: a note counter, a note validator and a note recycler. A controller controls operation of the system.

The controller may comprise a computer programmed with software for controlling operation of the system.

The system may be in a location remote from a central processor, and the computer may include a link and/or data output for communication with the central processor. The processing station may be enclosed within a housing constructed in accordance with ATM and/or safe grading standards, for example constructed of concrete and/or steel. Part, or all of the controller may be contained within the housing.

Embodiments of the invention will now be described with reference to the accompanying drawings.

Figure 3:
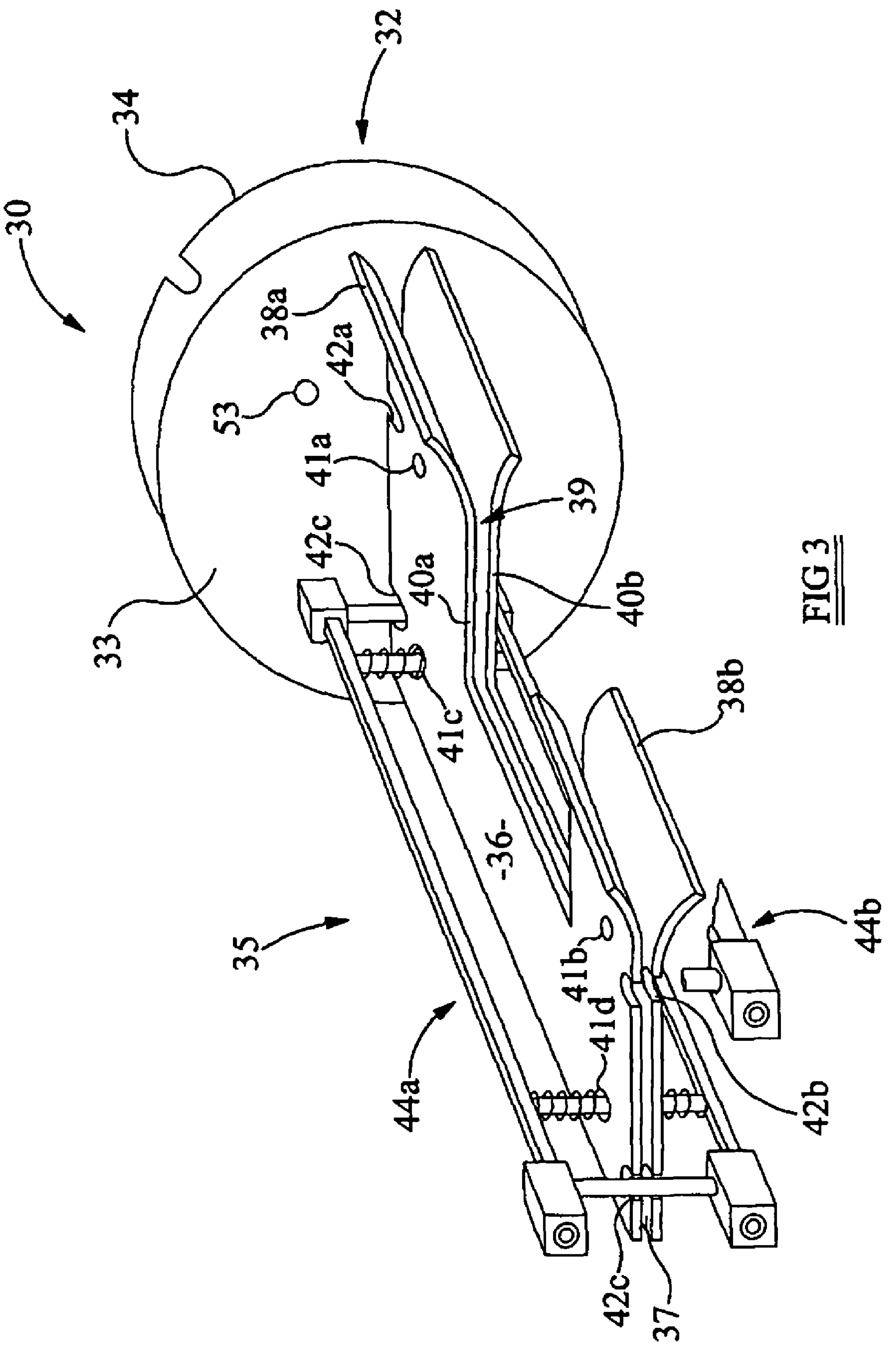
FIG. 3 is a partially cut-away illustration of a carrier in accordance with aspects of the present invention.
Figure 6B:
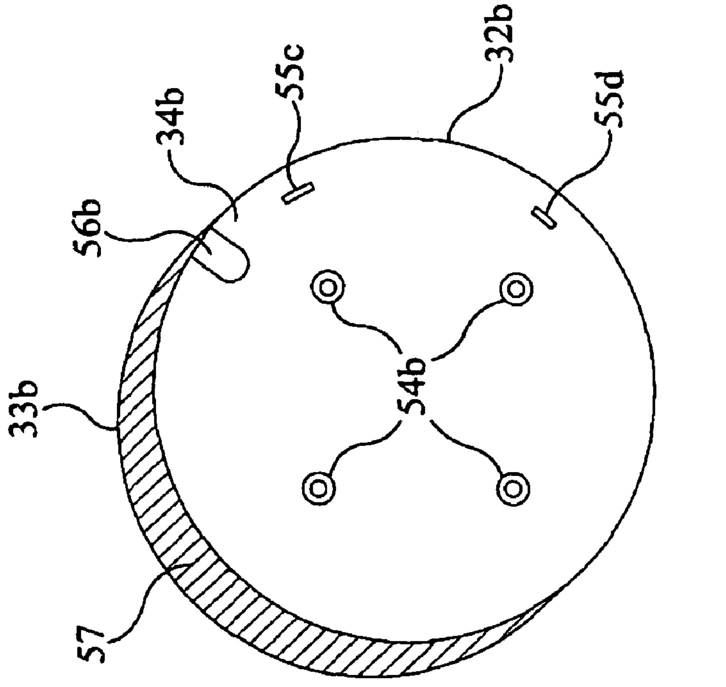
Figure 6A:
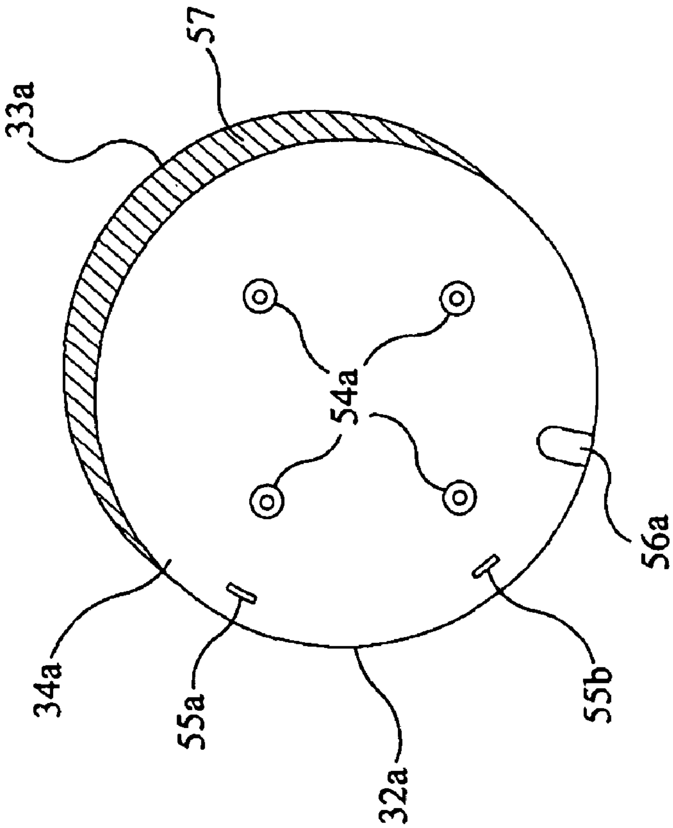

FIGS. 6*a* and 6*b* illustrate end views of each end of the carrier of FIG. 3.

Figure 7:
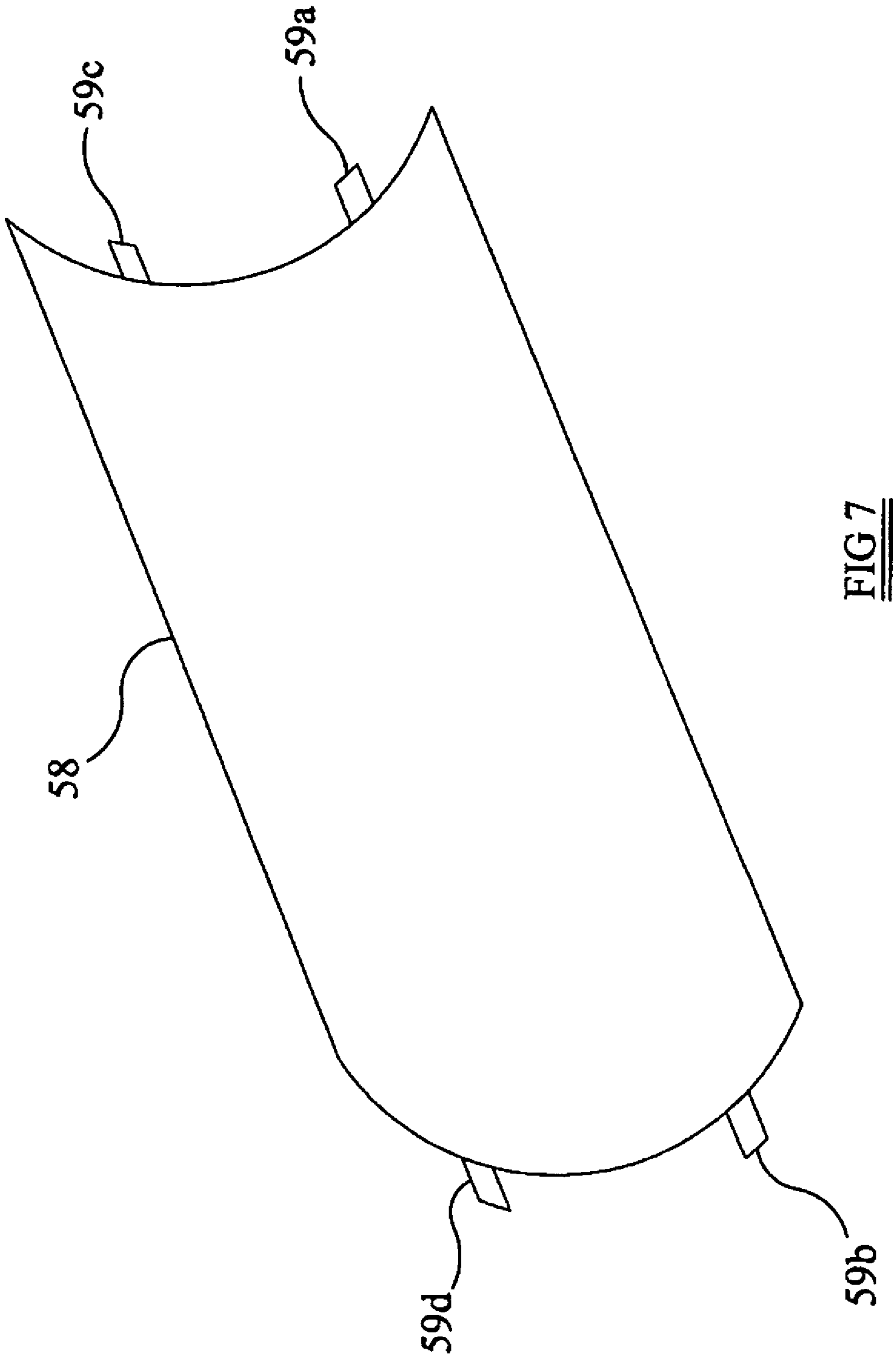

FIG. 7 illustrates a side wall for the carrier of FIG. 3.

Figure 8:
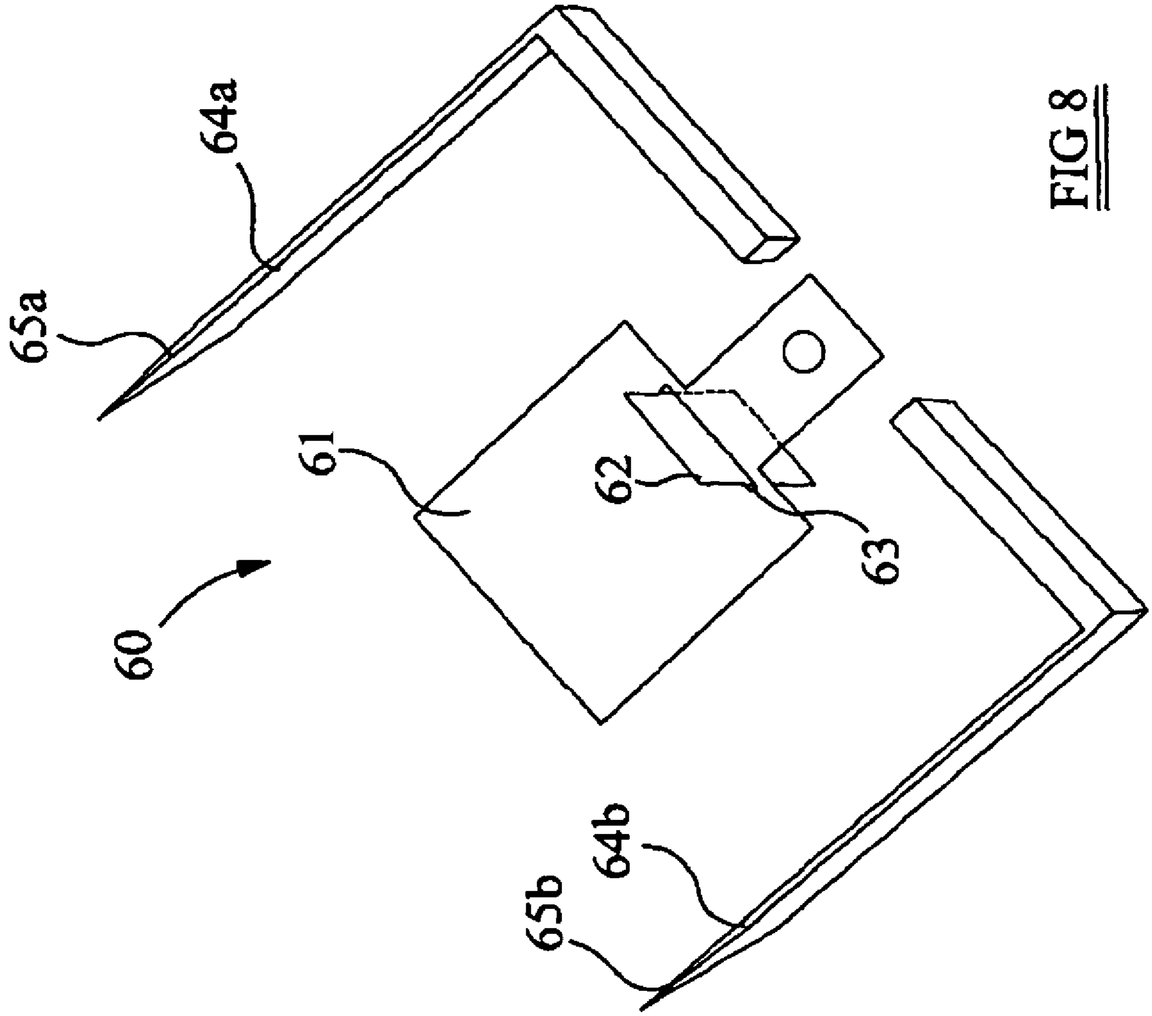

FIG. 8 illustrates part of an insertion device for inserting a sheaf of notes into the carrier of FIGS. 3 to 7.

Figure 9:
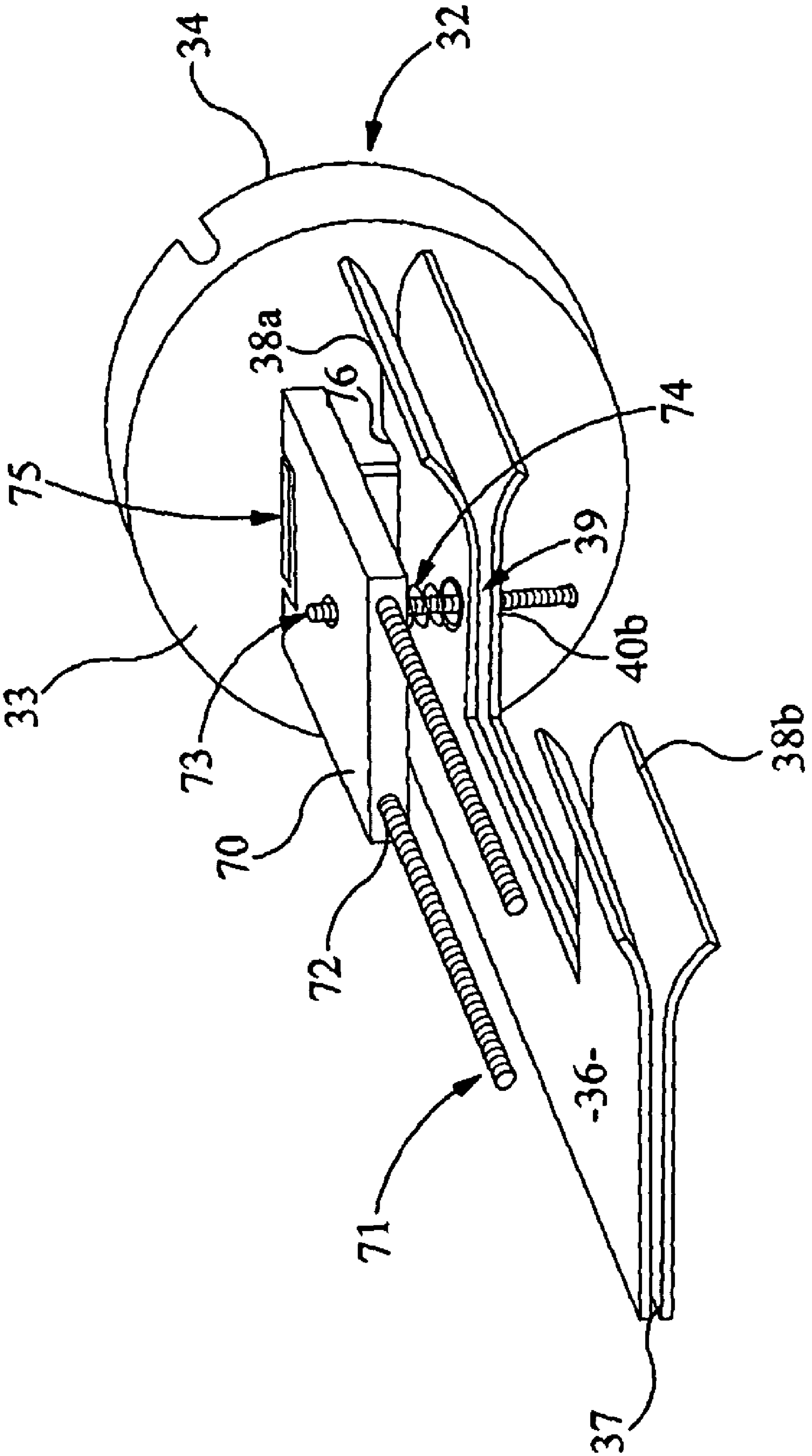

FIG. 9 illustrates part of an alternative arrangement of a carrier in accordance with the present invention.

Figure 10:
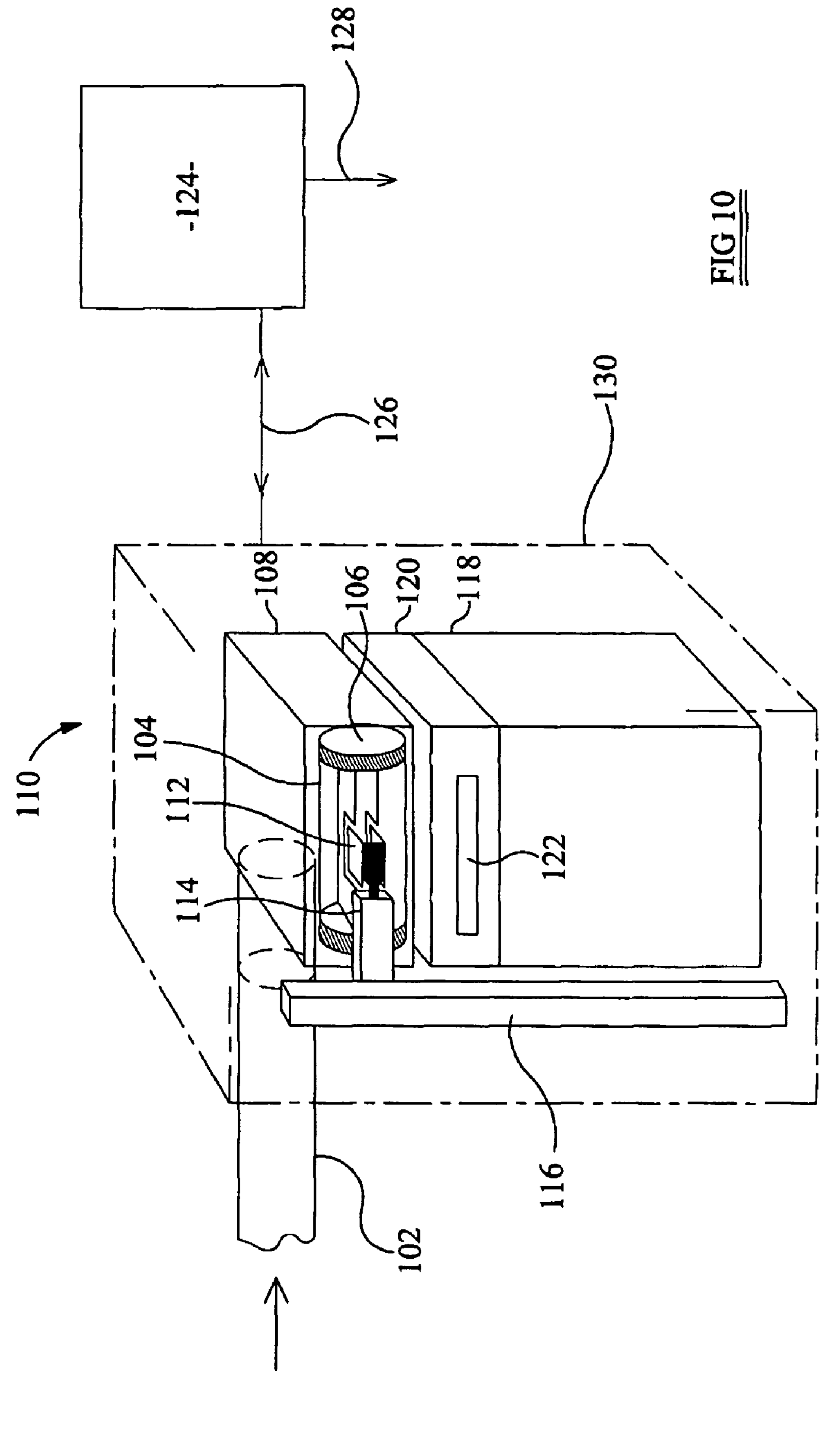

FIG. 10 illustrates a bank note processing system in accordance with an aspect of the invention.

Figure 11:
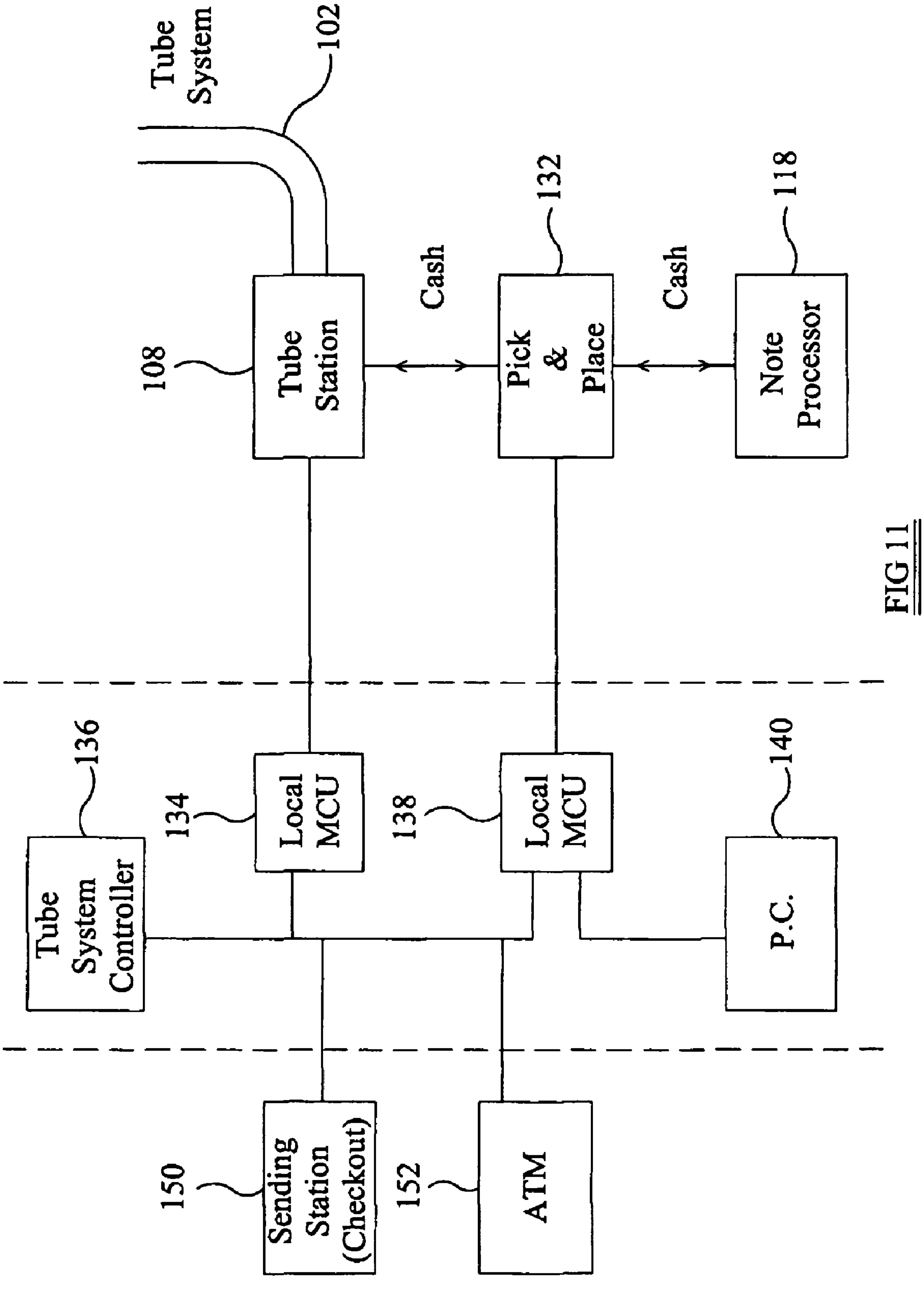

FIG. 11 is a schematic block diagram illustrating the functionality and control of the bank note processing system of FIG. 10.

Referring to FIG. 3, a carrier 30 of the type suitable for use in a pneumatic tube conveying system, includes a disc-shaped end-piece 32 having an inner circular face 33 and an outer circular face 34. The end-piece 32 is disposed at one end of the carrier while another similar end piece is disposed at the opposite end, but is not shown in FIG. 3 for clarity.

Figure 4:
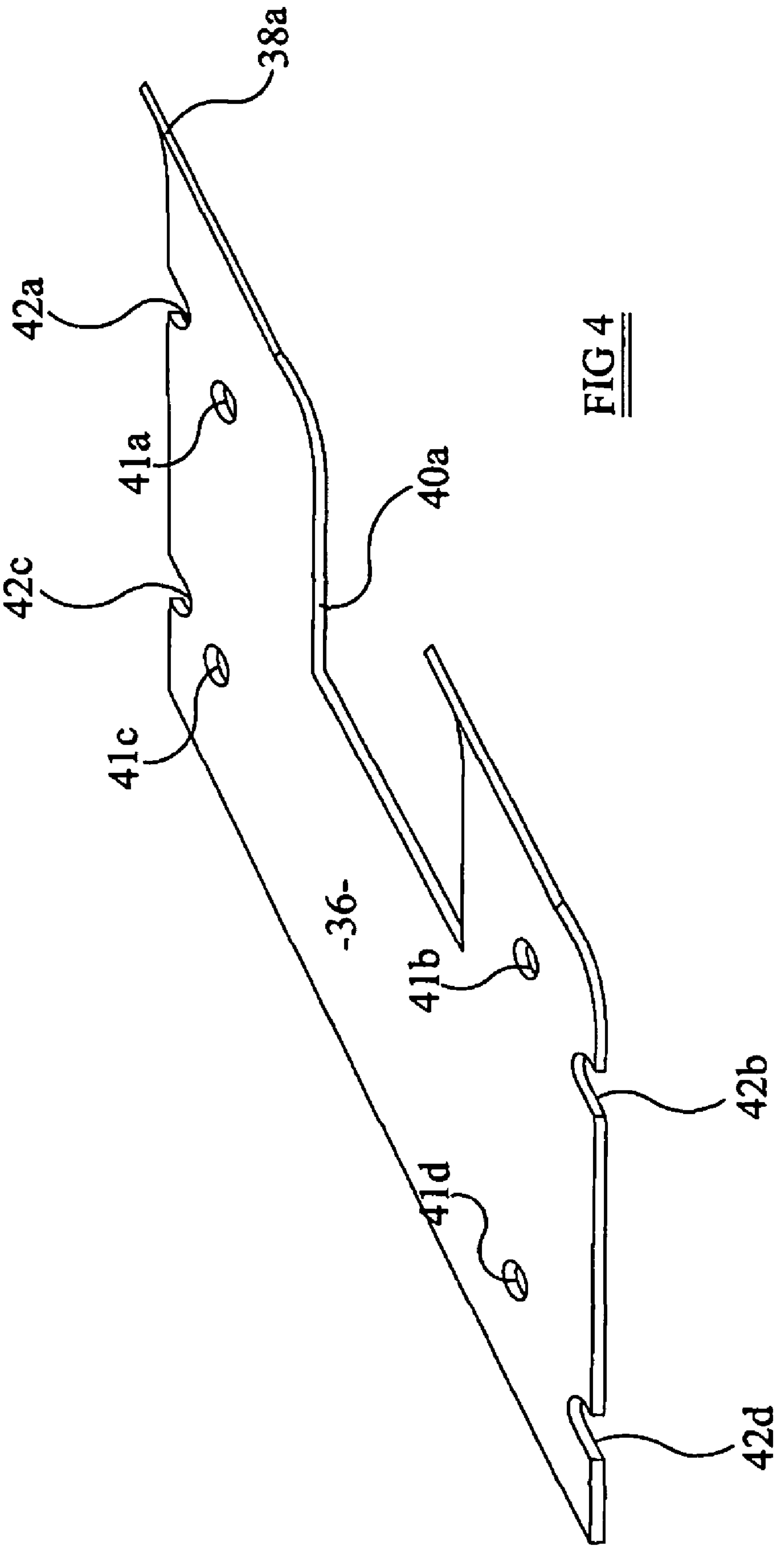
FIG. 4 illustrates a plate of a gripper forming part of the carrier of FIG. 3.

A gripper arrangement 35 is held in place between the end pieces and includes an upper gripper plate 36 and a lower gripper plate 37. The gripper plates 36, 37 are each preferably formed from a suitable metal sheet by a pressing or stamping operation. The gripper plates 36, 37 are disposed one above the other to form a pair of gripping surfaces between which a sheaf of bank notes can be gripped. FIG. 4 shows the upper gripper plate 36 in isolation, using the same reference numerals as used in FIG. 3. As shown in FIG. 3, each of the gripper plates 36, 37, is bent to turn away from the other plate towards a longitudinal edge 38*a*, 38*b* of the respective plate 36, 37 so as to present a mouth that leads into a gap 39 between the plates. The purpose of this mouth will be described in more detail below. Each of the gripper plates also includes a rectangular cut-out 40*a*, 40*b*, which is open to the respective longitudinal edge 38*a*, 38*b*. The purpose of these cut-outs will be described in more detail below.

Each of the gripper plates 36, 37 also includes two pairs of longitudinally aligned holes 41*a*, 41*b* and 41*c*, 41*d*, disposed such that each of the holes 41*a-d* in the upper plate 36 is aligned with the corresponding hole 41*a-d* in the lower plate. Each of the gripper plates 36, 37 also includes two pairs of U-shaped cut-outs 42*a*, 42*b* and 42*c*, 42*d*, one cut-out of each pair at each end of each plate. Each pair of cutouts 42*a*, 42*b* and 42*c*, 42*d* is longitudinally aligned with a respective pair of holes 41*a*, 41*b* and 41*c*, 41*d*.

Figure 5:
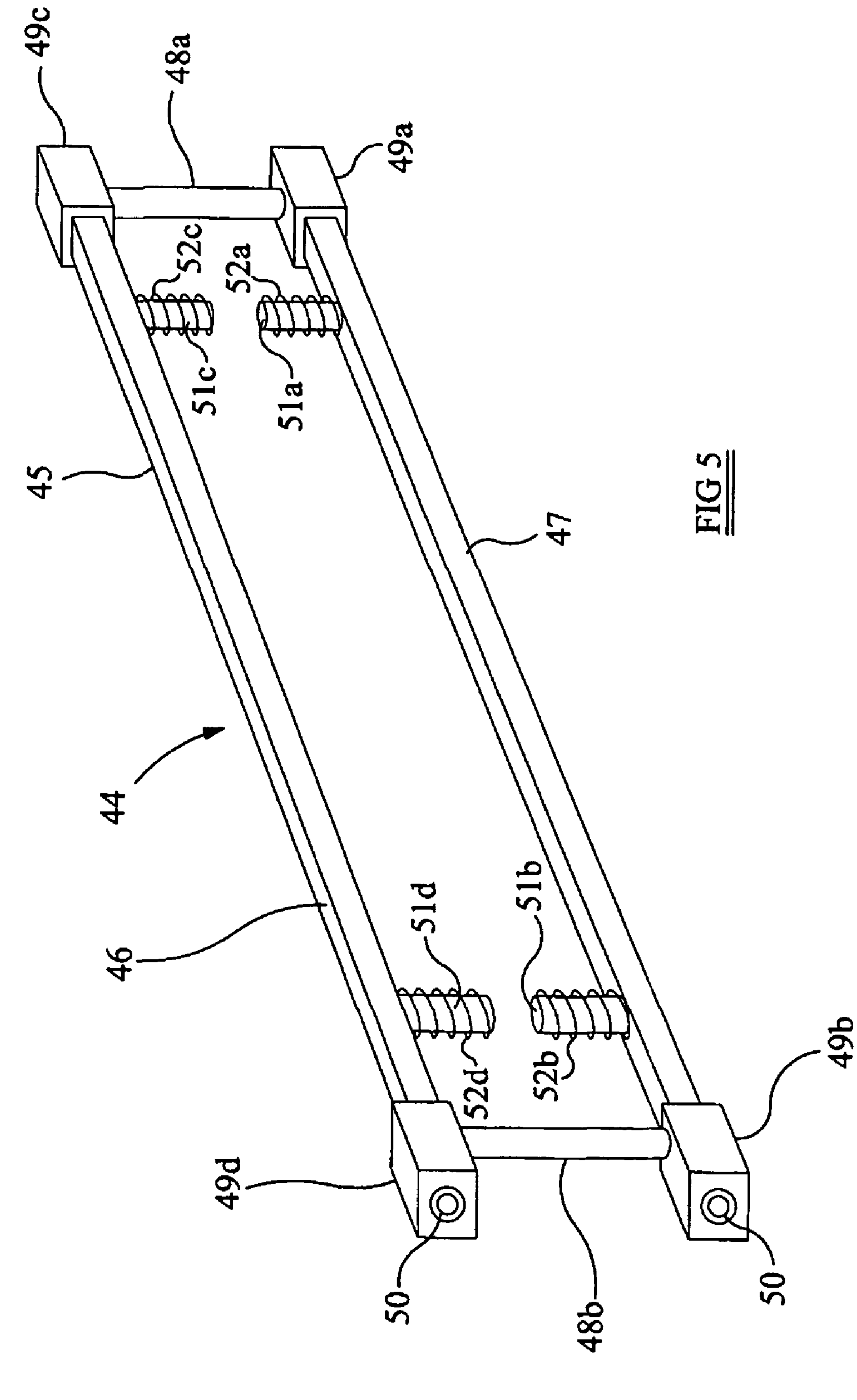
FIG. 5 illustrates a biasing arrangement for a gripper forming part of the carrier of FIG. 3.

Referring to FIG. 5, a biasing arrangement 44 comprises a frame 45 made up of an upper longitudinal square section member 46, a lower longitudinal square section member 47 and end members 48*a*, 48*b*. At each corner of the frame is a corner block 49*a-d* connecting a longitudinal square section member and an end member. The corner blocks each have an end face with a threaded hole 50. Extending inwardly of the frame 45 from each of the upper and lower longitudinal square section members 46, 47, are a pair of posts 51*a,b* and 51*c,d*. Each pair of posts 51*a,b* and 51*c,d* is positioned to align with a corresponding pair of holes 41*a,b* and 41*c,d* in the gripper plates. Each of the posts 51*a-d* has a diameter slightly smaller than the corresponding hole 41*a-d*, so that the posts can pass through the holes without interference. Around each of the posts 51*a-d* is an associated helical spring 52*a-d*. The diameter of each helical spring 52*a-d* is larger than that of the corresponding hole 41*a-d*.

Referring again to FIG. 3, the gripper arrangement 35 is assembled such that the gripper plates 36, 37 are supported between two parallel biasing arrangements 44*a,b* (although, for clarity, only part of the front biasing arrangement 44*b* is shown). The helical springs 41*a-d* exert a biasing force on the gripper plates 36, 37 tending to push them towards each other. The gripper plates 36, 37 are constrained by the end members 48*a,b* which are disposed to extend through the U-shaped cut-outs 42*a-d*. The cutouts 42*a-d* thereby act as guides so that the gripper plates 36, 37 can only move towards or away from each other with, or against, the biasing action of the helical springs 52*a-d*. The biasing arrangements 44*a,b* are fastened to the end pieces 32 by means of screws (not shown) that pass through holes 53 in the end piece 32.

Figure 2:
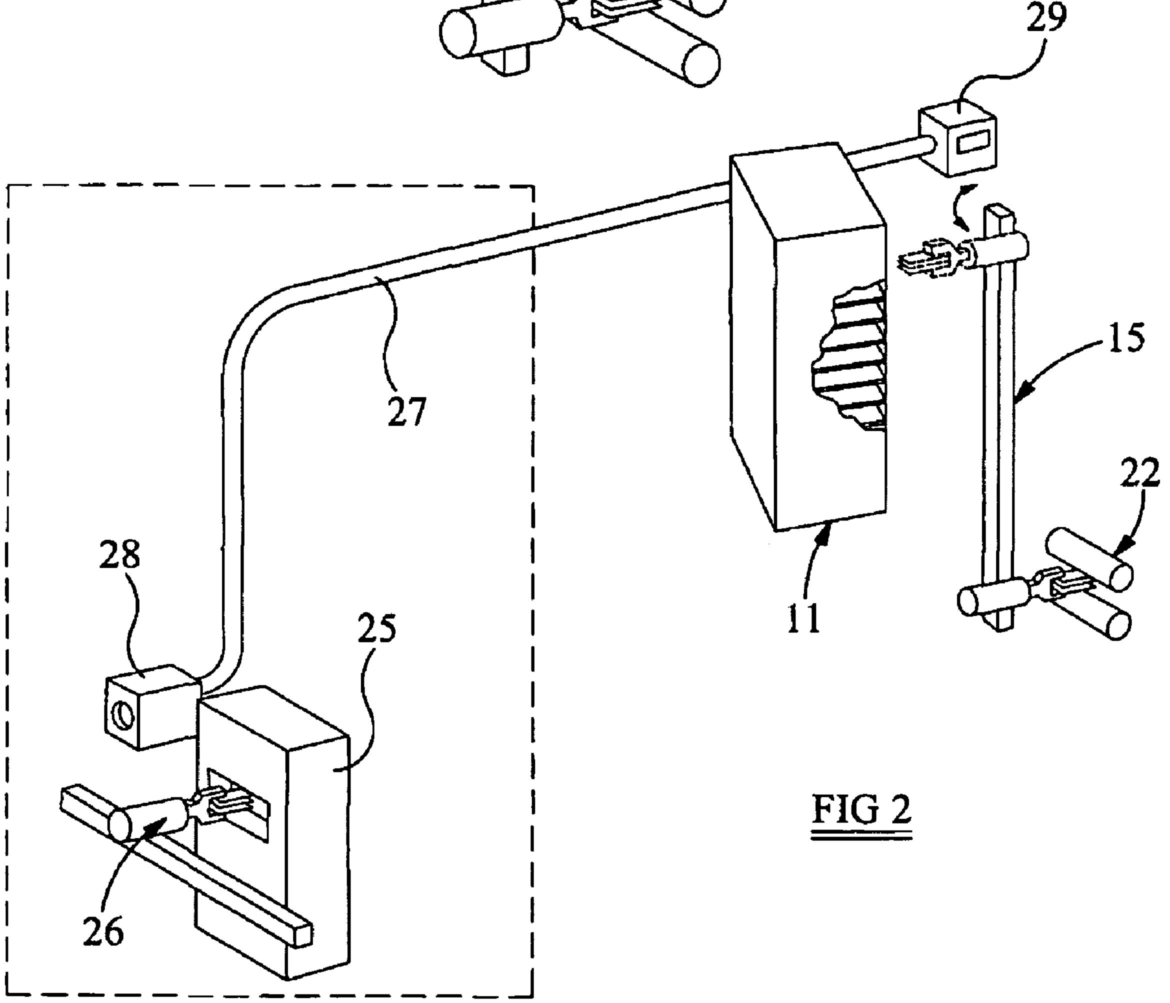
FIG. 2 is a diagrammatic illustration of a system for replenishing a cash storage unit of the type shown in FIG. 1.

Referring to FIGS. 6*a*, and 6*b*, the end pieces 32*a*, 32*b* which form the end of the carrier 30 of FIG. 3, each include an inner circular face 33*a,b* and an outer circular face 34*a,b* and are formed from a suitable rigid metal or plastics material. Each of the end pieces 32*a*, 32*b* has four holes 54*a*, 54*b* through which screws (not shown) pass to fasten the biasing arrangements 44*a,b* as described above. Each end piece 32*a*, 32*b* also has a pair of slots 55*a,b* and 55*c,d* located close to the circumference and spaced apart by about 90 degrees. Each end piece 32*a*, 32*b* also has a cut-out 56*a,b* formed in the respective outer circular face 34*a*, 34*b* at a position on the circumference of the disc. When the carrier is positioned in a sending station 28 or receiving station 29, as shown in FIG. 2, the cut-outs 56*a,b* can be engaged by a rotation mechanism to rotate the carrier on its axis so that the gripper mechanism is correctly aligned to receive or dispense a sheaf of notes. Wrapped around the outside of each of the end pieces 32*a,b* is a material 57 that is provided to assist in the aerodynamics of the carrier. The material may have a roughened surface and may, for example, be of a hook-and-loop fastener material such as Velcro®.

Referring to FIG. 7, an outer wall 58 of the carrier is formed of a sheet material, such as a metal or plastics sheet. The outer wall has a part-cylindrical curve and pairs of tongues 59*a,b* and 59*c,d* extending longitudinally (i.e. axially). These tongues engage in respective ones of the slots 55*a-d* in the end pieces. Note that the wall 58 extends only around a rear portion of the circumference of the cylindrical carrier 30. The front of the carrier 30, through which a sheaf of notes is inserted and extracted, remains open to the side.

Referring to FIG. 8, a depositing arrangement includes a device 60 that places a sheaf of notes into the carrier 30. The device 60 operates in a similar manner to the pick and place mechanism 26 of FIG. 2, and the principal features shown in FIG. 8 include a pair of gripper plates 61 (of which only one is shown) located one above the other so as to grip a sheaf of notes between them. The gripper plates 61 are slightly smaller than the rectangular cut-outs 40*a*, 40*b* in the gripper plates 36, 37 of the carrier. The gripper plates 61 are spring-loaded off a frame (not shown) to provide a gripping force, in a similar manner to, but with a smaller gripping force than, the gripper plates 36, 37 of the carrier. A stop member 62 extends perpendicular to the gripper plates 61 through slots 63. In addition, the depositing arrangement includes a pair of arms 64*a*, 64*b* that extend in a direction towards the carrier. The arms 64*a*, 64*b* are positioned so that when a sheaf of notes is held between the gripper plates 61, the sheaf will be located between (i.e. embraced by) the arms 64*a*, 64*b*. Each of the arms 64*a*, 64*b* has a tapered end portion 65*a*, 65*b*.

In use, an empty carrier 30 is delivered by the pneumatic conveyor system to a loading station, which is located in the position of the sending station 28 of FIG. 2. A sheaf of notes is collected by the device 60 of the depositing arrangement so that the sheaf is gripped between the plates 61. The sheaf is deposited into the carrier 30 by advancing the device 60 towards the carder, which is aligned (as described above using the cut-outs 56*a*, 56*b*) so that the sheaf will enter into the mouth that is formed between the front edges 38*a,b* of the upper and lower gripper plates 36, 37. As the sheaf of notes is offered up to the carrier 30, the gripper plates 36, 37 are compressed together by the biasing action of the helical springs 52*a-d*. In order to open the gripper 35, the tapered end portions 65*a*, 65*b* of the arms 64*a*, 64*b* enter the mouth that is formed between the front edges 38*a,b* of the upper and lower gripper plates 36, 37 as the device 60 is moved towards the carrier 30. The tapered shape of the arms pushes the plates 36, 37 apart against the biasing action of the springs 52*a-d*. By the time the sheaf of notes reaches the mouth, the gripper plates 36, 37 have been urged apart and the sheaf can be pushed all the way into the gap 39. The stop member 62 ensures that the sheaf is pushed all the way into the carrier 30. When the depositing device is withdrawn, the biasing action of the helical springs 52*a-d* urges the gripper plates 36, 37 towards each other so that they grip the sheaf.

Figure 1:
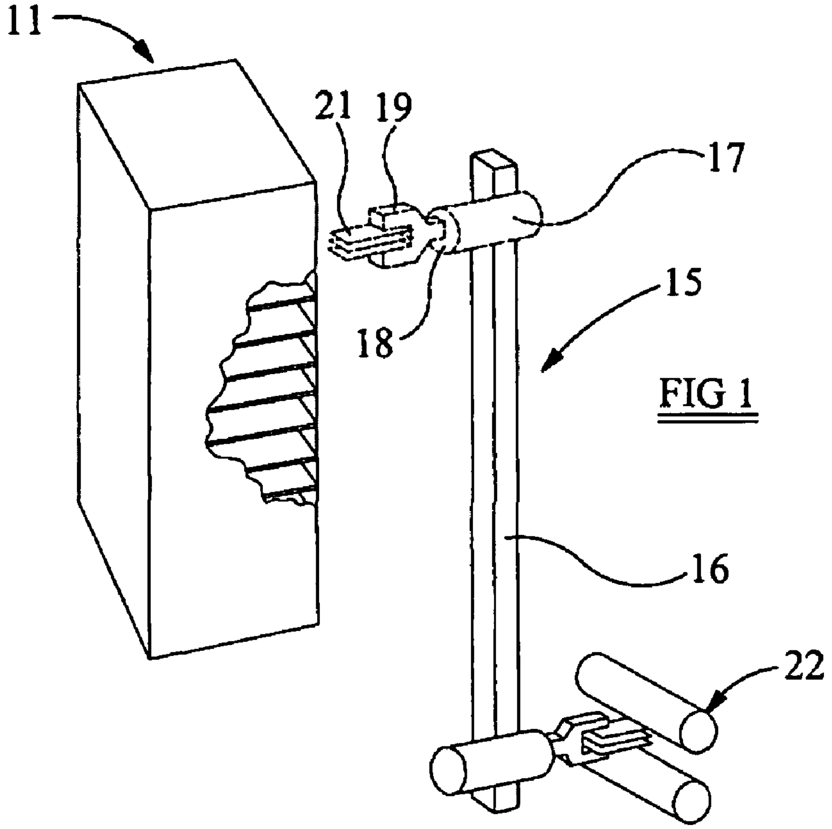
FIG. 1 is a diagrammatic illustration of a prior art cash storage unit and a pick and place mechanism.

The carrier with a sheaf of notes securely gripped between the gripper plates 36, 37, is then conveyed to a receiving location, for example adjacent a storage unit such as the storage unit 11 of FIG. 1. The sheaf of notes is now extracted from the carrier using an extractor mechanism. In principle this is similar to the "pick and place" device of FIG. 1. However, in the system of this invention, the carrier is brought to rest at the receiving station and is orientated so that the mouth of the gripper plates is aligned with extractor (as described above using the cut-outs 56*a*, 56*b*). The extractor has essentially the same form as the device 60 of the depositing arrangement without the arms 64*a,b*. That is to say, the extractor has jaws that grip the sheaf and is positioned so that the jaws come together to contact the top and bottom of the sheaf at the rectangular cutouts 40*a,b* in the upper and lower gripper plates 36, 37. Moreover, the jaws of the extractor are brought together with a mechanism that applies a force that is greater than the biasing force of the helical springs 52*a-d* of the gripper 35. Thus, when the extractor moves away from the carrier the sheaf of notes is pulled out of the gripper 35.

It will be appreciated by one of skill in the art, that the precise arrangement of the gripper mechanism may be varied without altering the principles of the invention. For example, as shown in FIG. 9 (where equivalent features are referred to with the same reference numerals) the frames 44*a*, 44*b* of the carrier of FIG. 3 are replaced with upper blocks 70 (only one of which is shown) located above and generally parallel to the upper gripper plate 36, and corresponding lower blocks (not shown) underneath the lower gripper plate 37. The blocks 70 are interconnected with horizontal (as shown) threaded rods 71 screwed into threaded receiving holes 72. Vertical threaded rods 73 extend between each upper block 70 and the corresponding lower block, passing through aligned holes 74 in the gripper plates 36, 37. The vertical threaded rods 73 pass axially through helical compression springs 74. Finally, the end pieces 32 each have a guide block 75 on the inner circular face 33, which aligns with cut-outs 76 in the gripper plates 36, 37 and replace the cut-outs 42*a-d* and vertical frame end members 48*a,b* of the arrangement shown in FIG. 3.

Referring to FIG. 10, a system for processing notes, such as bank notes, includes a conveyor apparatus 102. Conveyor apparatus 102 is preferably a pneumatic tube conveyor, of a type described above. The conveyor apparatus 102 conveys a carrier 104, which is of a type as described above and depicted in FIGS. 3-7. The carrier 104 has a gripper 106 for gripping a sheaf of notes, for example bank notes (not shown). The carrier 104 is shown positioned at a carrier receiving station 108, which is part of a processing station 110.

When the carrier 104 is received at the carrier receiving station 108 it is positioned so that the gripper 106 is aligned with an extractor 112 for extracting the sheaf of notes from the carrier 104. As described above in relation to FIGS. 3 to 7, the gripper 106 in the carrier 104 is resiliently biased for gripping the sheaf with a first gripping force. The extractor 112 also includes a gripper, which grips the sheaf with a second gripping force, greater than the first gripping force, in order to extract the sheaf from the carrier 104. The extractor 112 is part of a "pick and place mechanism" (similar to that described above in relation to FIGS. 1 and 2) and is carried on an arm 114 that is moved along a rail 116 or track.

The carrier receiving station 108 is positioned adjacent to (above in the embodiment shown), a note processor 118. The note processor includes a note receiver 120, with a slot 122 into which the notes are inserted by the extractor 112 after they have been extracted from the carrier 104. The note processor may include one or more of a variety of automated note processing operations such as a note counter, a note validator or a note recycler. After processing the notes are stored in the processing station 110 until they are either recycled, or collected/emptied.

The operation of the processing station is controlled by a controller 124. The controller 124 is implemented in a computer programmed with software for controlling operation of the system. The controller 124 is shown located outside the processing station 110, with a data communications link 126 between them. However, part or all of the controller 124 may be housed inside the processing station 110.

The processor 124 computer includes a link and/or data output 128 for communication with a central processor, which, for example, could be a central accounting computer of a bank. The system thus has the ability to provide management and audit information based on the notes that have been processed, either locally or to a central processing point (such as a bank's central accounting computer.

As shown by the chain-dotted lines in FIG. 10, the processing station 110 is enclosed within a housing 130. The housing

130 is preferably constructed in accordance with ATM and/or safe grading standards, and for example may be constructed of concrete and/or steel.

FIG. 11 is a schematic block diagram illustrating the functionality and control of the bank note processing system of FIG. 10, and shows in more detail exemplary components that go to make up the controller 124. As shown in FIG. 11, the system includes: the pneumatic conveyor tube 102, through which carriers are delivered to and dispatched from the tube station 108; a pick and place mechanism 132 (including, for example, extractor 112 carried on arm 114 movable along rail 116 as described above and shown in FIG. 10); and the note processor 118. Notes are transferred between the tube station 108 and the note processor 118 by means of the pick and place mechanism 132. The controller 124 includes a local tube station micro-controller unit 134, which controls the operation of the tube station 108 under instructions from a pneumatic tube system controller 136, which also controls operation of other parts of the pneumatic tube conveyor system, including a sending station 150. A second local micro-controller unit 138 controls operation of the pick and place mechanism 132 and the note processor 118, under instructions from a computer 140 (such as a p.c.). Control and data communications are provided by way of suitable cable or wireless means between the various control and hardware components. As shown this may also include data provided from an ATM 152 (automated teller machine) to/from which bank notes are supplied by way of the pneumatic tube system.

The invention claimed is:

1. A system for transporting a sheaf of notes from a storage location to a dispensing outlet or note processor, the system comprising: a conveyor apparatus; a carrier within which the sheaf is transported through the conveyor apparatus, wherein the carrier comprises a resiliently biased gripper for gripping the sheaf with a first gripping force; and an extractor for removing the sheaf from the carrier, wherein the extractor comprises an extraction gripping device configured to grip the sheaf with a second gripping force, which is greater than the first gripping force.

2. The system of claim 1 wherein the conveyor apparatus comprises a pneumatic conveyor.

3. The system of claim 2, wherein the pneumatic conveyor is a pneumatic tube conveyor.

4. The system of claim 1 wherein the resiliently biased gripper comprises a pair of opposing gripping surfaces biased towards each other.

5. The system of claim 4 wherein the pair of opposing gripping surfaces are surfaces of a pair of plates.

6. The system of claim 3 wherein the plates are shaped to provide a mouth for insertion of a sheaf between the plates.

7. The system of claim 3 wherein the plates are shaped to provide an ungripped portion of the sheaf in the carder, the extractor being configured to grip the sheaf at the ungripped portion to remove the sheaf from the carrier.

8. The system of claim 1 further comprising a depositing mechanism for inserting a sheaf of notes into the carrier.

9. The system of claim 8 wherein the depositing mechanism is configured to prize open the gripper and insert the sheaf into the carrier.

10. The system of claim 9 wherein the depositing mechanism comprises a shaped member whereby insertion of the shaped member between the gripping surfaces prizes them apart to open the gripper.

11. A system for processing notes, such as bank notes, the system comprising: a carrier comprising a gripper for gripping a sheaf of notes; a conveyor apparatus for conveying said carrier; a processing station receiving said carrier, the processing station comprising: an extractor for extracting said sheaf of notes from said carrier and inserting the noted into a note processor, wherein the note processor comprises one or more of: a note counter, a note validator and a note recycler, and a controller controlling operation of the system.

12. The system of claim 11 wherein the gripper is resiliently biased for gripping the sheaf with a first gripping force and the extractor is configured to grip the sheaf with a second gripping force, which is greater than the first gripping force.

13. The system of claim 11 wherein the conveyor apparatus comprises a pneumatic tube conveyor.

14. The system of claim 11, wherein the controller comprises a computer programmed with software for controlling operation of the system.

15. The system of claim 14 wherein the system is in a location remote from a central processor, and the computer includes a link and/or data output for communication with the central processor.

16. The system of claim 11 wherein the processing station is enclosed within a housing constructed in accordance with ATM and/or safe grading standards.

17. The system of claim 16 wherein the housing is constructed of concrete and/or steel.

18. The system of claim 16 wherein part or all of the controller is contained within the housing.

* * * * *

UNITED STATES PATENT AND TRADEMARK OFFICE

CERTIFICATE OF CORRECTION

PATENT NO. : 7,980,792 B2
APPLICATION NO. : 12/326451
DATED : July 19, 2011
INVENTOR(S) : Graham Siddle et al.

It is certified that error appears in the above-identified patent and that said Letters Patent is hereby corrected as shown below:

Title Page

The Assignee should be corrected to read:

(73) Assignee: Airtube Technologies Limited, Glostershire (GB)

Signed and Sealed this
Eleventh Day of October, 2011

David J. Kappos

David J. Kappos
*Director of the United States Patent and Trademark Office*